United States Patent [19]

Chester

[11] 4,310,452
[45] Jan. 12, 1982

[54] FRICTION MATERIALS
[75] Inventor: John Chester, Stockport, England
[73] Assignee: Feroda Limited, Manchester, England
[21] Appl. No.: 149,697
[22] Filed: May 14, 1980

Related U.S. Application Data

[62] Division of Ser. No. 929,535, Jul. 31, 1978, Pat. No. 4,273,699.

[30] Foreign Application Priority Data

Aug. 10, 1977 [GB] United Kingdom ............. 33458/77

[51] Int. Cl.³ .................... C08L 9/02; C08L 61/10
[52] U.S. Cl. ...................................... 260/38
[58] Field of Search ............... 260/38, DIG. 39, 37 M

[56] References Cited

U.S. PATENT DOCUMENTS

| | | | |
|---|---|---|---|
| 3,007,890 | 11/1961 | Twiss et al. | 260/38 |
| 3,455,868 | 7/1969 | D'Alessandro | 260/38 |
| 3,835,118 | 9/1974 | Rhee et al. | 260/38 |
| 3,956,545 | 5/1976 | Afflerback et al. | 428/37 |
| 3,967,037 | 6/1976 | Marzocchi et al. | 428/392 |
| 4,051,097 | 9/1977 | Aldrich | 260/38 |
| 4,119,591 | 10/1978 | Aldrich | 260/38 |
| 4,125,496 | 11/1978 | McGinnis | 260/DIG. 39 |

FOREIGN PATENT DOCUMENTS

| | | |
|---|---|---|
| 1780271 | 12/1971 | Fed. Rep. of Germany . |
| 2535526 | 2/1977 | Fed. Rep. of Germany . |
| 2535527 | 2/1977 | Fed. Rep. of Germany . |
| 2539847 | 3/1977 | Fed. Rep. of Germany . |
| 1363324 | 5/1964 | France . |
| 1575746 | 7/1969 | France . |
| 51-87549 | 7/1976 | Japan ......................... 260/DIG. 39 |
| 1206554 | 9/1970 | United Kingdom . |
| 1296463 | 11/1972 | United Kingdom . |
| 1387232 | 3/1975 | United Kingdom . |
| 1445975 | 8/1976 | United Kingdom . |

OTHER PUBLICATIONS

"Improving Brake Safety and Performance" *Machine Design* vol. 50, No. 15 (6/1977).

*Primary Examiner*—Wilbert J. Briggs, Sr.
*Attorney, Agent, or Firm*—Cushman, Darby & Cushman

[57] ABSTRACT

The invention concerns a composition for a friction material e.g. for a brake pad, of the type containing a fibrous reinforcement, a binder and various additives.

The composition contains a thermoset binder including a phenol-formaldehyde resin and making up 20 to 60% by volume of the material. Besides the resin the binder can also include a heat and chemical resistant rubber, but the phenol-formaldehyde resin makes up at least 10% by volume of the composition.

The composition includes a fibre-based reinforcement which makes up 10 to 35% by volume of the material and consists of a mixture of steel fibres or glass fibres with one or more other non-asbestos inorganic reinforcing materials e.g. steel fibre and mica, or steel fibre and milled glass.

The friction material contains no asbestos, but has properties comparable with asbestos-based materials.

10 Claims, No Drawings

FRICTION MATERIALS

CROSS REFERENCE TO RELATED APPLICATIONS

This is a division of our earlier application Ser. No. 929,535, filed July 31, 1978, now U.S. Pat. No. 4,273,699.

This invention relates to friction materials, and more preferably to friction materials of the kind used for brake pads, brake linings, clutch facings and similar uses.

Friction materials of this kind are generally composed of a thermoset binder, in inorganic fibrous reinforcement and various fillers and other additives. These compositions are required to withstand severe operating temperatures and pressures under repeated application without failure or deterioration in friction properties and the fibrous reinforcement generally used is asbestos. Numerous proposals have been made of compositions containing other inorganic fibrous reinforcement but such materials have so far found limited commercial acceptance.

According to the present invention a friction material comprises a thermoset binder, a fibre-based reinforcement and other fillers and additives, the thermoset binder comprising a phenol-formaldehyde resin and making up 20% to 60% by volume of the material of which more than 10% by volume of the material is said phenol-formaldehyde resin, and the fibre based reinforcement making up between 10 and 35 percent by volume of the material, and consisting of a mixture of steel fibres or glass fibres with one or more other non-asbestos inorganic reinforcing materials.

When the fibre-based reinforcement contains glass fibres the glass fibres preferably have a length of the order of 2 to 5 mm. The glass may be a conventional glass such as E-glass and will preferably have a surface dressing, as well known in the glass fibre art, to promote its adhesion to the binder. When the fibre-based reinforcement contains steel fibres the fibres are preferably fine, e.g. 0.125 mm diam., and with a length in the range 1 to 5 mm. The steel may be mild steel.

The fibre-based reinforcement is a mixture of materials one at least of which is steel fibre or glass fibre. If desired a mixture of steel fibres and glass fibres may be used. Other reinforcing materials which may be included in the mixture include reinforcing fillers such as mica and woolastonite.

The thermoset binder includes a thermoset resin based on a phenol-formaldehyde resin but may also include a heat and a chemical resistant vulcanized rubber, such as a nitrile rubber. Preferably a mixture of such materials is used of which the phenol-formaldehyde resin material preferably constitutes at least half. When a rubber is used it may be incorporated into the friction material in the form of a powder but is preferably incorporated in the form of a solution in a suitable organic solvent and a vulcanizing agent such as sulphur is also used.

The amount of thermoset binder is preferably in the range 20 to 32 percent by volume of the friction material.

In the manufacture of the friction materials various other materials may be included as fillers, friction and wear modifiers etc. the proportions of which can be varied to adjust the friction and other properties of the materials.

In the present case the preferred additives are particulate fillers, more preferably a mixture of such materials and friction and wear modifying materials.

The particulate fillers will generally be present in an amount between 10 and 50 percent by volume and may include such fillers as barytes, whiting, silica etc.

Examples of friction and wear modifiers are carbon, graphite, antimony trisulphide and molybdenum disulphide and metals, in a finely divided form. Examples of suitable metals are copper and tin. A mixture of such materials may be used, and the total amount of such materials may be up to 40 percent by volume.

The friction materials of the present invention are particularly suited to be manufactured by a press-moulding technique in which all the ingredients of the material are compounded together, the compounded mix disintegrated and (optionally dried) and then moulded into a component such as a brake pad in a die under pressure. The moulded component is then removed from the die and braked to cure the binder.

The invention provides friction materials which do not contain asbestos, and yet have comparable properties to asbestos-based friction materials.

The invention will now be illustrated, by way of example only, by means of the following examples.

EXAMPLES 1 to 3

For Example 1 sample disc-brake pads were manufactured according to the formulation given below in Table I. The ingredients were initially compounded together, the nitrile rubber being introduced into the mixture as a powder and the compound was disintegrated and dried. The material was then moulded into pads under pressure in a die and the mouldings baked in an oven to cure the binder.

TABLE I

| Nitrile rubber | 11.40 | parts by volume per 100 parts of material |
|---|---|---|
| Sulphur | 3.00 | |
| Phenol-formaldehyde resin | 20.00 | |
| Steel Fibres | 10.00 | |
| Mica (K37) | 5.00 | |
| Carbon Black | 5.39 | |
| Silica | 6.08 | |
| Barytes | 19.89 | |
| Graphite | 8.48 | |
| Antimony trisulphide | 2.39 | |
| Molybdenum disulphide | 1.79 | |
| Copper (powdered) | 5.38 | |
| Tin (powdered) | 1.20 | |

For Examples 2 and 3 samples were also made using the formulation given in Table I, except that the mixture of steel fibres (10 parts) and mica (5 parts) was replaced by mixtures of steel fibres (10 parts) and glass fibres (5 parts) and glass fibres (15 parts) and wollastonite (5 parts) respectively. In the latter case the proportions of the other ingredients in the total mix were correspondingly reduced.

In each case the sample pads produced were tested and found to have friction properties comparable to asbestos-containing materials.

EXAMPLES 4 and 5

These Examples illustrate different proportions of binder and reinforcing materials. Sample disc-brake pads were manufactured according to the formulations given below in Table II. The ingredients were initially compounded together, the nitrile rubber being introduced into the mixture as a 15–20% solids content solution in trichloroethylene, and the phenol-formaldehyde resin as a 70% solids content solution in methylated spirits. The compound was disintegrated and dried and then moulded into pads under pressure in a die and the mouldings baked in an oven to cure the binder.

In the following table the formulations are expressed in parts by volume.

TABLE II

| Example | 4 | 5 |
|---|---|---|
| Nitrile Rubber | 6.03 | 12.00 |
| Sulphur | 3.18 | 3.18 |
| Phenol-Formaldehyde resin | 14.91 | 12.00 |
| Steel Fibres | 10.00 | 10.00 |
| Mica | 3.50 | — |
| Milled E. Glass | — | 10.00 |
| Powdered Coke | 13.96 | 10.00 |
| Anorthite | 6.99 | 5.00 |
| Alumina | 0.50 | 0.50 |
| Barytes | 25.46 | 20.82 |
| Graphite | 8.97 | — |
| Carbon Black | — | 10.00 |
| Antimony Trisulphide | 2.00 | 2.00 |
| Copper | 4.50 | 4.50 |

In Example 4 the reinforcement was a mixture of Steel Fibres and mica (as in Example 1) but in Example 5 the reinforcement was a mixture of the steel fibres and milled E Glass, the latter being a dust composed of very short lengths of milled glass fibre. In Example 5 the binder included equal amounts of rubber and resin.

In dynamometer tests of the pads produced the coefficient of friction $\mu$ of the material of Example 4 varied from 0.26(cold) to 0.44(hot) and that of the material of Example 5 varied from 0.30(cold) to 0.55(hot).

The wear of the material of Example 4 was as good as, or better than, most conventional materials of comparable friction level. The wear of the material of Example 5 was reasonable for the level of friction, although higher than that of the material of Example 4.

The assembly shear strength of two pads of each material were measured, the values obtained for Example 4 being 2330 and 2140 psi and those for Example 5 being 2340 and 2230 psi.

$$\text{Assembly Shear Strength} = \frac{\text{load required to shear material off the backplate}}{\text{area of friction material bonded to the backplate}}$$

What I claim is:

1. An asbestos-free friction material composition suitable for moulded friction pads consisting essentially of a thermosetting binder, a fiber-based reinforcement together with other fillers and additives, wherein
   (a) the thermoset binder consists essentially of a phenolformaldehyde resin and optionally a nitrile rubber,
   (b) the thermoset binder constitutes 20% to 60% by volume of the composition of which at least half is said phenolformaldehyde resin,
   (c) the fiber-based reinforcement consists essentially of a mixture of (1) fine steel fibers having a length in the range of 1 to 5 mm, and (2) a non-asbestos mineral reinforcing filler powder containing mica, said steel fibers being the sole ferrous metallic component,
   (d) the fiber-based reinforcement constitutes 10% to 35% by volume of the composition, and
   (e) the balance of the composition consists essentially of inorganic friction and wear modifiers.

2. A friction material composition according to claim 1 in which said balance of the composition contains about 6.58% or less of metallic powder.

3. A friction material composition according to claim 1 which includes a particulate filler selected from barytes, whiting, silica and mixtures thereof and, said filler present in an amount of between 10 and 50% by volume of said material.

4. A friction material composition according to claim 1 wherein said staple steel fibers constitute at least half the volume of said reinforcement.

5. A friction material composition according to claim 1 wherein said particulate filler is barytes, whiting, silica or mixtures thereof.

6. A friction material composition according to claim 1 wherein said friction or wear modifiers are carbon, graphite, antimony trisulfide, molybdenum disulfide and brass, copper or tin in finely divided form.

7. An asbestos-free friction pad molded from a composition consisting essentially of:
   (1) as a binder, a mixture of a phenol-formaldehyde resin and a nitrile rubber, at least half of the binder component being the phenol-formaldehyde resin, the binder component consisting from 20% to 60% by volume of the composition;
   (2) an asbestos-free fiberous reinforcement consisting essentially of a mixture of:
      fine steel fibers having a length in the range of about 1 mm to about 5 mm,
      a mica-containing non-asbestos mineral reinforcing filler powder, the fiberous reinforcement consisting from 10% to 35% by volume of the composition;
   (3) balance consisting essentially of inorganic friction and wear modifiers.

8. The asbestos-free molded friction pad of claim 7 wherein the thermoset binder constitutes from 20% to 32% of volume of the composition.

9. The asbestos-free molded friction pad of claim 7 wherein the inorganic friction and wear modifiers are carbon, graphite, antimony trisulphide, molybdenum disulphide, copper, tin or mixtures thereof and are present in finely divided form.

10. The asbestos-free molded friction pad of claim 7 or 9 wherein the friction and wear modifiers constitute from 10% to 50% by volume of the composition.

* * * * *